Patented Apr. 20, 1937

UNITED STATES PATENT OFFICE 2,077,586

PRODUCTION OF ACETALDEHYDE FROM ACETYLENE

Walter Rosinsky, Oppau, and Paul Baumann, Ludwigshafen-on-the-Rhine, Germany, assignors to I. G. Farbenindustrie Aktiengesellschaft, Frankfort-on-the-Main, Germany No Drawing. Application October 12, 1932, Serial No. 637,544. In Germany October 14, 1931

6 Claims. (Cl. 260—139)

The present invention relates to the production of acetaldehyde from acetylene.

In the British Patent No. 313,864 one of the present inventors has disclosed a process for the production of acetaldehyde from acetylene according to which concentrated aqueous solutions of neutral salts, especially of those of the solid heavy base metals and particularly of their halides the concentrated aqueous solutions of which show an acid reaction which solutions are called "ansolvo acids" (see Liebig's "Annalen der Chemie", vol. 455, pages 228 and following) are allowed to act on acetylene, preferably at elevated temperature.

The said reaction of so-called "ansolvo acids" is not based upon the decomposition of the said salts in aqueous solution by way of hydrolysis. The solution of the salts which are not too dilute contain true acids which usually are called ansolvo acids. The character of these ansolvo acids is based upon the fact that they form complex compounds in which the metal atom is joined with the oxygen atom of the water by auxiliary valences. The existence of true salts of the ansolvo acids is a proof of their acid character. If the solutions of the so-called ansolvo acids are diluted, the acid reaction becomes weaker. Upon further dilution, the solutions at first become practically neutral. At this point, the so-called "ansolvo acids" are destroyed. Upon continued dilution hydrolysis of the salts may take place, whereby an acid reaction is effected which is quite different from that of the so-called ansolvo acids.

As ansolvo acids are known especially the concentrated aqueous solutions of the water-soluble halides, that is, chlorides, bromides, iodides and fluorides of gold, platinum, zinc, cadmium, mercury, calcium, magnesium, beryllium, iron, cobalt, chromium, copper, manganese. For the process in question compounds are preferably employed which are not hydrolyzed by water, or only in a very subordinate degree, the water-soluble halides from halogens having an atomic weight above 19 and the solid heavy base metals of the 2nd group of the periodic system, i. e. of zinc and cadmium, of the metals of the iron group and of chromium being preferred therefore and as giving very strong and cheap ansolvo acids; but also other ansolvo acids such as those from calcium, magnesium, gold and platinum halides might be used. Since the chlorides are most stable and most easily available we prefer these halides more than bromides or iodides though the latter are not inoperative. A solution of 1 molecular proportion of zinc chloride, free from mineral acid and basic compounds in 2 molecular proportions of water is particularly suitable for example. If, under the said conditnons, it is desired to obtain acetaldehyde in a continuous operation, an acetylene should be used which is as pure as possible because the usual impurities present in acetylene, especially in acetylene obtained by the thermal decomposition of hydrocarbons at high temperatures, may exert an injurious effect on the catalytic liquid, the efficiency of which may be gradually decreased by the formation of resinous by-products of the reaction. In the aforesaid process the acid reacting aqueous solutions are of such a high concentration that they are almost liable to crystallization of the neutral salts and possess very high boiling points. The maximum of concentration attainable without crystallization at, say 20° C., is for example 1 molecular proportion of zinc chloride per 2 molecular proportions of water, the boiling point of which solution is about 163° C. at atmospheric pressure.

We have now found that in the said process it is not necessary to attach such importance to the degree of purity of the initial gas but that gas mixtures from any source containing acetylene may also be worked without difficulties into acetaldehyde by causing the initial gas to act under increased pressure on dilute solutions of at least one of the aforesaid salts, the said solutions being dilute, however, in such a degree only that the so-called ansolvo acids are still present. Thus, in the case of zinc chloride, for example, a solution of 1 molecular proportion of zinc chloride in from 3 to 4 molecular proportions of water may be employed or even a still more dilute solution; the limit of dilution lies at about the ratio zinc chloride:water of about a molecular proportion of 1:7.

Since the term "dilute" is only relative to the term "concentrated" used in our said prior disclosure and since the ratio of salt to water in the "concentrated" solutions of the different salts varies according to the nature of the different salts as shown above, the differentiation is more easy and comprehensive when based on the boiling points of the "concentrated" and "dilute" solutions. Compared with the boiling points of the concentrated solutions the boiling points of the dilute solutions employed in the present case are at atmospheric pressure.

| Degrees centigrade | 1 molecular proportion of | In molecular proportions of water |
|---|---|---|
| 146 | Zn Cl$_2$ | 3 |
| 132 | Zn Cl$_2$ | 4 |
| 114 | Zn Cl$_2$ | 7 |
| 126 | Fe Cl$_3$ | 5 |
| 116 | Fe Cl$_3$ | 7 |
| 102 | Cd Cl$_2$ | 10 |
| 116 | Cr Cl$_3$.6H$_2$O | 5 |
| 109 | Cr Cl$_3$.6H$_2$O | 7 |

Thus for the sake of brevity and definiteness the dilute solutions of maximum concentration for the purpose of the present invention will be hereinafter and in the claims referred to as solutions the boiling point of which is at least 4° C., preferably at least 6° C., below that of saturated solutions (that is of solutions of actual maximum concentration at 20° C. and which do not crystallize at the said temperature), the highest degree of dilution possible being defined by the salt being still present in the form of the so-called ansolvo acid. In view of the low boiling point of solutions of cadmium chloride, this halide is usually employed in combination with more easily soluble chlorides such as those of zinc, iron or chromium. The additions of promoting substances, as will be described later, are generally so small that they do not substantially alter the boiling point of the solutions.

The optimum concentration of the catalytic liquid may be readily ascertained in each case by a preliminary test, and varies according to the salt, capable of forming a so-called ansolvo acid, employed. As is the case with zinc chloride there is a certain lower limit of concentration for each salt below which appreciable conversion of acetylene into acetaldehyde no longer takes place, which limit is always slightly above the concentration at which methyl orange no longer indicates an acid reaction of the solution. Similarly, the solutions of the other neutral salts must equally still show an acid reaction.

The dilution may be effected either by adding the water to "concentrated" salt solutions or it may be continuously supplied in the form of water vapour, which is added to the gaseous material, so that, during the reaction, the "concentrated" salt solutions are diluted. If desired, both features may be combined, while taking care that the salt solutions still contain the so-called ansolvo acid. The quantity of water in the form of vapour added to the gaseous initial materials is generally from about equal to about treble that of the acetylene, preferably from about 0.8 to about 1.5 parts by weight of water in the form of steam for each part by weight of acetylene.

Apart from a considerable cheapening of the catalyst the process according to the present invention has the special advantage that with a given amount of the compound forming the so-called ansolvo acid, considerably larger amounts of acetylene may be treated and greater yields per unit of time and space may be obtained than in cases when employing highly concentrated ansolvo acids. In comparison to the other "wet-catalyst" methods of hydrating acetylene, the present process is considerably superior as it avoids the employment of substantial quantities of costly and poisonous mercury compounds.

As explained above, instead of solutions of zinc chloride, for example solutions of chromic chloride, cadmium chloride or also iron chloride or mixtures of these solutions may be employed, if desired with the addition of other heavy metal compounds known to be capable of promoting metal hydration catalysts, as for example any mercury compounds, as for example any water-soluble salts of mercury with inorganic or organic acids, organic compounds of mercury with hydrocarbons, such as mercury diphenyl, and mercury oxides, as well as water-soluble uranium halides and water-soluble halides of gold and of the metals of the platinum group. The said additions are usually employed in quantities of from about 0.1 to about 5 per cent by weight of the ansolvo acid forming salts, preferably in quantities of from about 0.5 to about 1 per cent.

If a gas mixture obtained by the thermal decomposition of hydrocarbons, especially in the electric arc or by cracking mineral oils (and containing mainly acetylene, other hydrocarbons, hydrogen and nitrogen) be employed as the initial gas, this is freed from carbon black and higher unsaturated hydrocarbons, such as diacetylene, butadiene and the like, and is then led under pressure, for example at from about 1 to about 20 atmospheres, through the catalytic liquid, or the carbon black alone may be removed in any known and suitable manner, as for example by filtration. In the latter case it is preferable to employ a comparatively small pressure amounting only to a few atmospheres, say from 1 to 5 atmospheres, during the reaction with the so-called ansolvo acids in order to avoid a marked formation of injurious by-products formed from the said unsaturated impurities. The degree of pressure applied is generally increased with the degree of solution of the salt solutions in order to increase the boiling point thereof but is generally kept between about 0.5 and about 20 atmospheres, a pressure of from about 1 to about 5 atmospheres being, however, sufficient in most cases. On working with pure or almost pure acetylene the pressure must not exceed, however, that at which explosions are known to occur. Finally, the non-purified crude gas may be subjected directly to the conversion, the catalytic liquid being subjected periodically to a purification with adsorptive substances, such as bleaching earths, active carbon, Fuller's earth and the like, which are capable of retaining the impurities and at the same time act as a filter for the carbon black. This purification, which is also favourable in the case of partially purified gases, may be carried out by continuously withdrawing a part of the liquid from the reaction vessel, treating it with substances of the said kind and returning it in a purified state to the reaction vessel.

It is important for the convenient carrying out of the process to maintain the selected concentration of the catalytic liquid. This may be effected for example by continuously supplying to the liquid the amount of water necessary for the formation of acetaldehyde, if the initial gaseous mixture does not already contain a corresponding amount of water vapour. For example if the initial gas has been prepared by the thermal decomposition of hydrocarbons in such manner that the resulting gases have been quenched with water, the gas laden with the vaporized water may be supplied to the catalytic liquid. According to this invention it is preferable to lead the acetylene or gas containing acetylene, if desired together with water vapour, through a cylindrical vessel provided with Raschig rings or constructed in some other way as a washer and filled with the catalytic liquid, to free the current of gas laden with the aldehyde vapours from aldehyde by washing and then to return it to the apparatus, if desired in admixture with fresh gas. The gas when freed from acetylene or from the acetaldehyde formed therefrom may be employed for example as a heating gas.

The working temperature depends on the concentration of the solution and the pressure employed; generally speaking it lies between about 80° and about 250° C., preferably between about 130° and 190° C., which temperatures may be also attained by preheating the gaseous initial materials.

The following examples will further illustrate the nature of this invention but the invention is not restricted to these examples. The parts are by volume.

Example 1

A gas mixture obtained by the thermal decomposition of methane in the electric arc, which has been freed from carbon black and washed with gas oil to remove higher unsaturated hydrocarbons and which has the following composition: 15 per cent of methane, 4.5 per cent of nitrogen, 68.5 per cent of hydrogen and 12 per cent of acetylene, is led at a pressure of 15 atmospheres and at a temperature of about 170° C. with a velocity of flow of 60,000 parts per hour through a cylindrical tube lined with lead and charged with 1,500 parts of a solution of zinc chloride containing 1 molecular proportion of zinc chloride to each 4 molecular proportions of water. The gas leaving the apparatus at a pressure of 15 atmospheres is freed from the acetaldehyde formed by washing with water and returned to the apparatus together with fresh gas. The water necessary for the conversion (about 45 parts per hour) is continuously supplied to the catalytic liquid. About 70 per cent of the initial acetylene are converted into acetaldehyde, the degree of purity being from about 96 to 98 per cent.

If the gas current be led under the same conditions through a solution which contains 1 molecular proportion of zinc chloride to each 2 molecular proportions of water, the catalytic solution gradually resinifies, while when working at atmospheric pressure it remains active for a long time but considerably smaller amounts of crude gas are capable of being converted per unit of time and space.

Example 2

A gas as specified in Example 1 but also containing 1 per cent of higher unsaturated hydrocarbons (diacetylene, allylene and butadiene) is led at a pressure of 1 atmosphere above atmospheric pressure and at a speed of flow of 10,000 parts per hour through 1,500 parts of a solution of 1 molecular proportion of zinc chloride in 3 molecular proportions of water. About one fifth of the solution is continuously led over a filter charged with bleaching earth and, thus freed from impurities and maintained in a highly active condition, returned to the reaction vessel. The working up of the reaction gas is carried out in the manner described in Example 1. From about 75 to 85 per cent of the initial acetylene are converted into acetaldehyde in the form of an about 97 per cent aqueous solution thereof.

The same procedure is followed when the initial gas contains small amounts of carbon black the latter likewise being retained by the bleaching earth. Instead of zinc chloride, a mixture of a solution of 5 molecular proportions of zinc chloride in 15 molecular proportions of water with a solution of 1 molecular proportion of cadmium chloride in 3 molecular proportions of water may be employed.

Example 3

100,000 parts of a gas mixture having the following composition: 84 per cent of methane, 14 per cent of acetylene and 2 per cent of hydrogen, of carbon dioxide and of higher unsaturated hydrocarbons, such as diacetylene, allylene and butadiene are mixed with from 17,000 to 20,000 parts of water vapour; the mixture is heated to about 150° C. and led at a pressure of 1 atmosphere above atmospheric pressure, in the course of one hour, through 3,000 parts of a solution of 1 molecular proportion of zinc chloride in 2.2 molecular proportions of water. This solution has a specific gravity of about 2 and is kept at a temperature of from 165° to 170° C. in a lead-lined tube; at the inlet of the tube a porous ceramic mass is provided through which the gaseous mixture is pressed and very finely divided within the solution. About 95 per cent of very pure acetaldehyde is formed, calculated on the amount of acetylene employed. The gaseous mixture leaving the apparatus carried with it about 50 parts of water per hour in the form of steam; it is freed from the acetaldehyde formed by washing with cold water, and is then returned to the apparatus together with fresh gas and steam. The process can be carried on continuously during several weeks, about 50 parts of water per hour necessary for maintaining the concentration of the solution being continuously supplied to the catalytic liquid.

Example 4

The gaseous mixture employed in Example 1 is led as described therein through a solution of one molecular proportion of zinc chloride in 4 molecular proportions of water, which solution has a specific gravity of 1.84 and is kept at about 150° C. 3,000 parts of the solution are reacted per hour with 100,000 parts of the initial gas to which from 8 to 10 parts of steam are added. 83 per cent of acetaldehyde, calculated on the amount of acetylene employed, are formed. The gaseous mixture leaving the apparatus is worked up as described in Example 3 and is then returned, together with fresh gas and steam, into the reaction vessel, about 100 parts of water per hour being continuously introduced into the solution.

What we claim is:—

1. In the catalytic hydration of acetylene to acetaldehyde by passing a gaseous mixture comprising acetylene, while warming and at a pressure above atmospheric pressure in the explosion-avoiding range, through an aqueous solution of a hydration catalyst, the step which comprises carrying out the reaction with an aqueous catalyst solution essentially containing at least one water-soluble halide of a heavy metal, selected from the group consisting of zinc chloride, chromium chloride, ferric chloride and cadmium chloride capable of giving an acid reaction with water, the concentration of said salt solution being so low that its boiling point, at atmospheric pressure, is at least 4° C. below that of a solution saturated at 20° C. but so high that the said solution still remains a so-called ansolvo acid.

2. In the catalytic hydration of acetylene to acetaldehyde by passing a gaseous mixture comprising acetylene, while warming to from about 80° to about 250° C. and at a pressure above atmospheric pressure in the explosion-avoiding range, through an aqueous solution of a hydration catalyst, the step which comprises carrying out the reaction with an aqueous catalyst solution essentially containing at least one water-soluble halide of a heavy metal, selected from the group consisting of zinc chloride, chromium chloride, ferric chloride and cadmium chloride capable of giving an acid reaction with water, the concentration of said salt solution being so low that its boiling point, at atmospheric pressure, is at least 4° C. below that of a solution saturated at 20° C. but so high that the said solution still remains a so-called ansolvo acid.

3. In the catalytic hydration of acetylene to acetaldehyde by passing a gaseous mixture comprising acetylene and a from equal to treble quantity thereof of water vapour through an aqueous solution of a hydration catalyst while warming and at a pressure above atmospheric pressure in the explosion-avoiding range, the step which comprises carrying out the reaction with an aqueous catalyst solution essentially containing at least one water-soluble halide of a heavy metal, selected from the group consisting of zinc chloride, chromium chloride, ferric chloride and cadmium chloride capable of giving an acid reaction with water, the concentration of said salt solution being so low that its boiling point, at atmospheric pressure, is at least 4° C. below that of a solution saturated at 20° C. but so high that the said solution still remains a so-called ansolvo acid.

4. In the catalytic hydration of acetylene to acetaldehyde by passing a gaseous mixture comprising acetylene through an aqueous solution of a hydration catalyst while warming and at a pressure above atmospheric pressure in the explosion-avoiding range, the step which comprises carrying out the reaction with an aqueous catalyst solution essentially containing one molecular proportion of zinc chloride per from 3 to 7 molecular proportions of water.

5. In the catalytic hydration of acetylene to acetaldehyde by passing a gaseous mixture comprising acetylene through a concentrated aqueous solution of at least one water-soluble halide of a heavy metal, selected from the group consisting of zinc chloride, chromium chloride, ferric chloride and cadmium chloride while warming and at a pressure above atmospheric pressure in the explosion-avoiding range, the step which comprises carrying out the reaction while adding to the initial gaseous mixture a quantity of water vapour, sufficient to reduce the boiling point, at atmospheric pressure, of said solution below that of a corresponding solution saturated at 20° C. but so small that the said solution still remains a so-called ansolvo acid.

6. In the catalytic hydration of acetylene to acetaldehyde by passing a gaseous mixture comprising acetylene through a concentrated aqueous solution of zinc chloride, while warming and at a pressure above atmospheric pressure in the explosion-avoiding range, the step which comprises carrying out the reaction while adding to the initial gaseous mixture a quantity of water vapour, sufficient to reduce the boiling point, at atmospheric pressure, of said solution below that of a corresponding solution saturated at 20° C. but so small that the said solution still remains a so-called ansolvo acid.

WALTER ROSINSKY.
PAUL BAUMANN.